2,948,628

METHOD OF MAKING CERAMIC DIELECTRIC

Eugene Wainer, Cleveland Heights, Ohio, assignor to Horizons Incorporated, Princeton, N.J., a corporation of New Jersey No Drawing. Filed Aug. 2, 1955, Ser. No. 526,058

6 Claims. (Cl. 106—39)

This invention relates to ceramic dielectric materials possessing outstanding ferroelectric properties and to a method of making same. More particularly, it relates to ferroelectric ceramic materials in which the final particle size of the components in the fired ceramic does not exceed five (5) microns and preferably does not exceed two (2) microns. I have found that by maintaining these extremely fine particle sizes in the finished ceramic, dielectric materials both in the form of thin films or in massive form are produced possessing properties heretofore considered to be unobtainable.

In the past, a wide variety of ferroelectric compositions have been developed which are presently available commercially. One large group of these materials is based upon barium titanate or barium titanate modified by the addition of other alkaline earth metal compounds such at titanates, zirconates, stannates, and the like as described in U.S. Patents 2,402,515, 2,402,516 and 2,402,517. Another group is exemplified in U.S. Patent 2,646,359 in which combinations of barium titanate and alkali metal columbates or tantalates are described. Other known compositions based on barium titanate include those with additions of lead zirconate, barium cerate and other compounds. Any of the above described compositions may be improved by the practice of my invention, herein described.

Barium titanate, unmodified by the addition of any of the foregoing materials, has a Curie point in the region of 120° C. At this particular temperature, the material is effectively tetragonal in structure and exhibits a dielectric constant between 6,000 and 10,000 at one megacycle. Above this temperature, barium titanate is cubic and the higher the temperature above 120° C., the lower the dielectric constant until, at temperatures of about 200° C., the dielectric constant is at most a few hundred. At temperatures below 120° C., barium titanate is tetragonal and the dielectric constant drops rapidly to about 1500 or 1600 at 85° C. and remains relatively constant at this value to about 10° C. At this temperature, the structure transforms to orthorhombic and the dielectric constant drops rapidly with decreasing temperature to approximately 500, at temperatures about 0° C. With further decrease in temperature, at about −80° C., the structure changes to a monoclinic form and a further drop in dielectric constant is experienced. As a consequence, barium titanate is useful as a dielectric at temperatures between 10° C. and 85° C., a range which is entirely too narrow for many requirements.

Barium titanate and barium titanate modified by the addition of the above described materials are characterized by a perovskite structure and this class of materials possesses a group of desirable properties based on the spontaneous alignment of electric dipoles by mutual interaction. Illustrative of the properties possessed by these prior art ferroelectric materials based on barium titanate are the following:

(1) DIELECTRIC CONSTANT

Compositions prepared from unmodified barium titanate and barium titanate modified as above described exhibit dielectric constants ranging from a few hundred to several thousand at both low and high frequencies and accordingly, such materials have been widely applied as capacitors for filter and bypass use.

(2) CHANGE IN DIELECTRIC CONSTANT WITH TEMPERATURE

As previously described, the dielectric constant of barium titanate changes appreciably with changes in temperature. However, many of the modified barium titanates exhibit relatively uniform changes in dielectric constant with changes in temperature and hence, have been found to be useful in compensating frequency drift in electronic circuits as a function of change in temperature, particularly at low levels of dielectric constant.

(3) SPONTANEOUS POLARIZATION

Like all true ferroelectric materials, many compositions based on barium titanate exhibit the property of spontaneous polarization. Such compositions may, through application of an external D.-C. field, be polarized so that the dipoles all line up in the same direction. Under such conditions, the materials become piezoelectric and may be used as a non-single crystal type of transducer or resonator, for example, in phonograph pick-ups, sonar work, ultrasonics, and the like.

(4) NON-LINEARITY OF DIELECTRIC CONSTANT

Upon the application of an external field, barium titanate dielectrics may experience a change in the dielectric constant of as much as a factor of 5–10 as a result of the application of such a field. In this case, and above the Curie point, the dielectric constant will drop with increasing field. As a result of this property, the material is useful in dielectric amplifiers, nonlinear resonant circuit devices, frequency modulation and the like.

(5) HYSTERESIS

Single crystals of these ferroelectric materials exhibit square-shaped hysteresis loops and ceramics approach this type of hysteresis loop. As a result, these materials find application in memory devices and in flip-flop circuits.

(6) BREADTH OF CHANGE IN DIELECTRIC CONSTANT AND POWER FACTOR WITH TEMPERATURE

One important disadvantage of the ferroelectrics above described is the broad change in dielectric constant and power factor exhibited by the barium titanate ceramic or single crystal as a function of change in temperature. For example, as has been previously described, the dielectric constant of unmodified barium titanate at room temperatures is about 1500 and at temperatures in the region of the Curie point, 120° C., the dielectric constant is between 6000 and 10,000. Similar variations with temperature are characteristic of the other compositions in which barium titanate is modified by the addition of stannates, zirconates, tantalates and the like.

(7) LOW DIELECTRIC BREAKDOWN

Another defect of this class of ferroelectric materials is the relatively low applied voltage which they are able to withstand before they experience breakdown as a dielectric. The utility of these materials is sharply limited for capacity work because they cannot be employed at potentials much in excess of about 30 to 35 volts per mil.

(8) NON-LINEAR PROPERTIES

The non-linear properties of these materials becomes increasingly evident at higher field strengths and actually become of considerable importance when biased voltages of at least 30 to 35 volts per mil are applied to the specimen. At these values, the ceramic is therefore dangerously close to an area of destruction before its complete utility is achieved.

(9) AGING

A further disadvantage of these compositions lies in the change in properties with time. This effect has heretofore been designated as the aging effect. This lack of stability with time is very serious for components which must be placed in storage for extended periods prior to insertion in equipment, and is particularly undesirable in military applications.

(10) TEMPERATURE

A final disadvantage for compositions based particularly on barium titanate is the fact that for the majority of applications, for which they are theoretically capable, they may only be used at temperatures below about 85° C.

As will be appreciated, the unusual properties possessed by barium titanate compositions have been responsible for their application to a large number of very useful and unusual devices.

Nevertheless, in spite of the obvious advantage of these dielectric materials, the basic disadvantages of wide variation of dielectric constant with changes in temperature, low dielectric strength, poor aging qualities, and the general instability of the ceramic under a combination of all of these effects, limits the usefulness of this interesting family of materials for a wide number of potential applications which might exist on a purely theoretical basis.

Present invention

It is one object of this invention to produce a ferroelectric material free from many of the disadvantages of the prior art materials and possessing a particularly advantageous combination of properties.

It is another object of this invention to produce an improved ferroelectric material based on barium titanate and/or related ferroelectric materials including niobates, tantalates, tungstates, zirconates and the like, and mixtures of these ferroelectrics with each other, with antiferroelectrics, and mixtures of ferroelectrics with perovskite type structured substances whether these latter are ferroelectric or not.

It is another object of this invention to produce a superior ferroelectric material based on barium titanate, allied substances and ferroelectric compositions in which the particle size of the individual crystallites in the finished fully vitrified ceramic does not exceed 5 microns, and preferably does not exceed 2 microns.

It is a further object of this invention to provide a method for producing a ferroelectric ceramic material of the desired degree of fineness.

It is a further object of this invention to provide a method for producing ferroelectric components from raw materials by first producing the material in the form of extremely finely divided particles, forming the particles into a ceramic and then firing the formed ceramic with great rapidity in order to produce a fully vitrified article in which the particle size is not appreciably coarser than the particle size of the original material from which the ceramic was formed.

These and other objects will become readily apparent to those skilled in the art from the following specification and claims.

Normal commercial ceramics are usually composed of fully sintered crystallites having particle sizes ranging between 20 microns and 200 microns. In many instances, these individual crystallites are coarse enough to be readily seen by the naked eye. Although frequently the raw materials of a batch are ground to a fineness below 40 microns, the intentional addition or accidental presence of mineralizers in the batch prior to firing and the retention of the material at elevated temperatures of the order of 2600° F. to 2700° F. for relatively long periods of time during firing permits diffusion to proceed rapidly and the individual particles to grow in size or to combine with other particles. This growth may be so pronounced that when extremely thin elements are involved, as is the case for many ferroelectric components, actual rupture of the film is produced by the growth of the particles.

I have found that, when the barium titanate is produced in extremely fine particle sizes and is then suitably formed into a ceramic shape and fired with extreme rapidity so as to minimize the effects of diffusion as completely as possible, a vitrified ceramic may be obtained in which the eventual particle size in the fired film is not much coarser than that originally present in the raw material. These fine particles may be produced by suitable mechanical or chemical means.

The prior standard technique of preparing ferroelectric materials, such as those previously mentioned, has been to mix oxides or carbonates of the respective alkali or alkaline earth metal with the oxide of titanium or niobium or tantalum in proper proportions and to calcine the mixture at an elevated temperature in order to effect the reaction between the ingredients. The temperature of reaction is normally determined by the rate of diffusion between the components. One of the defects resulting from use of commercial barium carbonate in the preparation of barium titanate lies in the impurities which are usually associated with the barium carbonate, namely strontium, silica, alumina, sodium and sulfur.

In the chemical preparation of pure finely divided ferroelectric compounds, following the techniques of the present invention, these impurities may be eliminated in any suitable way as will appear from the following description. For purposes of illustration, there is described a method of obtaining barium titanate.

One suitable method for chemically preparing finely divided barium titanate free from mineralizing agents involves the use of organic derivatives, particularly the alcoholates, of barium and titanium. The use of such compounds insures the complete avoidance of chloride contamination. Barium methylate is made by decomposing a chemically pure barium chloride solution with pure sodium methylate or pure sodium amalgam.

$$BaCl_2 + 2NaOCH_3 \rightarrow Ba(OCH_3)_2 + 2NaCl$$

Titanium tetraethylate is produced by reacting titanium tetrachloride, purified by re-distillation as above described, with sodium ethylate in absolute alcohol under rigidly anhydrous conditions. Titanium tetraethylate and sodium chloride are produced by the reaction.

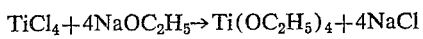

$$TiCl_4 + 4NaOC_2H_5 \rightarrow Ti(OC_2H_5)_4 + 4NaCl$$

The sodium chloride removed by filtration leaves an alcohol solution of titanium tetraethylate. The barium methylate prepared as above is dissolved in the alcohol solution of the titanium tetraethylate and the resulting solution is slowly hydrolyzed with water until the decomposition is complete. Crystals of barium titanium hydrate, $BaTiO_3 \cdot xH_2O$, are obtained by digesting the water-alcohol solution at the boiling point after which the product is recovered either by filtration and washing or by evaporation of the mother liquor. I prefer recovery by filtration and washing. The product so obtained is dried and calcined at a temperature not exceeding 1600° F. for about one hour. The calcine is easily ground in a conventional ball mill and finely divided chemically pure barium titanate having a particle size between about 0.02 and 0.05 micron is readily obtained.

Instead of preparing the barium titanate by the above chemical means, finely divided barium titanate may be prepared by mechanical means by high energy milling in a super ball mill. Barium titanate, for example the normal commercial product, is mixed with an organic solvent such as toluene in the ratio of one part by weight of barium titanate to 3 parts by weight of toluene. The mixture is placed in a metal cylinder half filled with stainless steel balls which are roughly one millimeter in diameter. The ball mill is vibrated perpendicularly for about two or three hours. As a result, barium titanate particles having particle sizes in the range of 300 to 1000 angstrom units or of the order of 0.03 to 0.1 micron in diameter are obtained.

To prepare the desired ceramic, a suitable temporary binder must be added to the finely divided ferroelectric material. Many binders have been found to be suitable. Excellent temporary binders for producing thin sections of ferroelectrics are based on methyl cellulose dissolved in water, polyvinyl butyrate dissolved in ethyl acetate, methyl methacrylate dissolved in ethyl acetate, polystyrene dissolved in toluene and many others may be used as temporary binders in the formation of the ferroelectric component into a suitable shape prior to firing. The important requirement is that the film forming material be strong enough to hold the film in place without cracking during the extremely rapid firing cycle and that it be dissipated readily during the short firing cycle without leaving a carbonaceous residue.

The firing schedule requires that the piece be brought to full temperature within 20 minutes, that is from room temperature to 2500° F. in 20 minutes, and the piece is then maintained at this temperature for a time not exceeding 10 minutes and then is cooled as rapidly as possible. If temporary binders such as the ones listed above are used, a procedure which has been found to be excellent is a double firing technique, in which the piece is fired slowly up to a temperature not exceeding 1000° F. so as to remove the temporary binder completely. The specimen is then immediately placed in a furnace at the firing temperature (about 2500° F.) and maintained at this temperature for a time period of the order of 10 to 20 minutes.

If the system is entirely water borne, the water may be eliminated by the usual techniques of drying and ceramics may be prepared by pressing and the like followed by the extremely rapid firing schedule necessary to obtain a properly vitrified ceramic in which the individual particles are of the desired size. This technique has been successfully followed for the production of films up to 50 mils in thickness, without appreciable loss by disintegration.

Measurement of electrical properties of the ceramic at once indicate the unique character of the procedure. For example, a one mil film of barium titanate produced as indicated has a breakdown voltage in excess of 400 volts per mil, as compared with the standard breakdown voltage of the order of 50 to 60 volts per mil of similar films of the normally coarsely crystalline barium titanate. The Q factor at a bias of 60 kilovolts per centimeter is of the order of 700 compared with a value of less than 100 for the normal coarsely crystalline ceramic. The dielectric constant of this extremely finely divided thin film barium titanate is approximately 620 at 25° C. and does not exceed a value of 640 at 150° C. A pronounced increase in dielectric constant does not begin to be exhibited until a temperature of the order of 200° C. is obtained. In addition, the dielectric constant of finely divided barium titanate produced in this manner is of the order of 550 at −40° C. and thus a radically different picture is shown with respect to variation of dielectric constant with temperature as against the normal type of coarsely crystalline barium titanate. Below a bias voltage of 25 volts per mil, the dielectric constant is not strongly modified. However, above a bias voltage of 25 volts per mil, the dielectric constant drops precipitously. Thus, the desired non-linear properties of barium titanate have been maintained—at the same time the properties desirable for capacitor purposes are still in evidence.

Much more important than these improvements is the fact that such fine particled ceramics do not exhibit any aging characteristics whatsoever even after storage for a year.

There are many theoretical explanations for these unusual properties, but it is not the purpose of this description to delve into this aspect of the situation. By and large, it appears that one of the reasons for the improvement in properties is the production of a ceramic in which the particle size of the individual crystallite is not larger than that exhibited by a single ferroelectric domain.

A similar improvement in properties is obtained even when the base ceramic composition is highly complex such as a barium strontium titanate body, for example. Normally, a barium strontium titanate which has been designed to exhibit its Curie temperature at room temperature will have its Curie temperature shifted to radically higher levels by using the fine particled technique. The losses are reduced substantially, the dielectric strength is increased considerably, and the losses of properties on aging are eliminated entirely.

The usual flat temperature coefficient ceramics such as those based on combinations of barium titanate and sodium niobate, barium titanate and potassium tantalate, and barium titanate and lead zirconate are also radically improved by application of the fine particle technique. These ceramics, even if coarse, have relatively flat temperature coefficients, but their aging properties and loss characteristics are relatively poor. Application of the fine particle technique drastically improves loss characteristics, eliminates aging, and multiplies the breakdown voltage by a factor of at least 10.

Accordingly, it has been found that the technique described is applicable to barium titanate itself and to any of the modifications of barium titanate through the result of additions of their alkaline earth metal compounds such as titanates, zirconates, stannates, and the like as described in U.S. Patents 2,402,515; 2,402,516; 2,402,517; and others, as well as to the family of niobates and tantalates heretofore described.

Although the practice of my invention has been described in the foregoing specification with specific reference to barium titanate, it will be understood by those skilled in the art that the techniques disclosed are equally applicable to other ferroelectric materials, as well as to mixtures of these ferroelectrics with each other, with antiferroelectrics, and mixtures of ferroelectrics with perovskite-type structured substances whether these latter are ferroelectric or not.

I claim:

1. The method of preparing a temperature stabilized, non-aging, high dielectric ceramic consisting essentially of at least one ferroelectric material selected from the group consisting of alkaline earth metal titanates, lead titanate, alkaline earth metal zirconates, lead zirconate, alkaline earth metal and alkali metal tantalates, tungstates, and niobates, alkaline earth metal cerates, lead cerate, and alkaline earth metal stannates comprising: preparing a ceramic mixture of said ferroelectric material in the form of particles substantially all of which are smaller than about one micron in size, mixing a readily dissipated binder with the finely divided ferroelectric material, forming the mixture into a coherent body and maintaining said body at a temperature between about 2400° F. and about 2600° F. for a time not exceeding 10 minutes, and rapidly cooling the fired body to obtain a finished article in which the particle size of the individual crystallites is between about 1 and 5 microns.

2. The method of preparing a temperature stabilized, non-aging high dielectric ceramic consisting essentially of at least one ferroelectric material selected from the group consisting of alkaline earth metal titanates, lead titanate, alkaline earth metal zirconates, lead zirconate, alkaline earth metal and alkali metal tantalates, tungstates, and niobates, alkaline earth metal cerates, lead cerate, and alkaline earth metal stannates comprising: preparing a ceramic mixture of said ferroelectric material in the form of particles substantially all of which are smaller than about one micron in size, mixing a readily dissipated binder with the finely divided ferroelectric material, forming the mixture into a coherent body and maintaining said body at a temperature of about 2500° F. for a time not exceeding 10 minutes and rapidly cooling the fired body to obtain a finished article in which the particle size of the individual crystallites is between about 1 and 2 microns.

3. The method of preparing a temperature stabilized non-aging, high dielectric ceramic consisting essentially of at least one ferroelectric material selected from the group consisting of alkaline earth metal titanates, lead titanate, alkaline earth metal zirconates, lead zirconate, alkaline earth metal and alkali metal tantalates, tungstates, and niobates, alkaline earth metal cerates, lead cerate, and alkaline earth metal stannates comprising: preparing a ceramic mixture of said ferroelectric material in the form of particles substantially all of which are in the form of particles which are smaller than about 1 micron in size, mixing a readily dissipated binder with the finely divided ferroelectric material, forming the mixture into a coherent body, heating said body to remove the binder completely, and then maintaining the body at a temperature of between about 2400° F. and 2600° F. for a time period not exceeding 10 minutes and thereafter rapidly cooling the fired body to obtain a finished article in which the individual crystallites are between about 1 and 5 microns.

4. A method of preparing a pure barium titanate ferroelectric material in the form of particles substantially all of which are smaller than 1 micron in size which comprises: mixing an alcoholate of barium with an alcoholate of titanium in an alcohol solution, hydrolyzing the mixture with water, digesting the mixture at the boiling point, recovering the barium titanate hydrate from the said digestion by filtration, calcining the product at a temperature below 1600° F. and grinding the calcine to a particle size smaller than 1 micron.

5. A method of preparing a pure barium titanate ferroelectric material in the form of particles substantially all of which are smaller than 5 microns in size which comprises: mixing an alcoholate of barium with an alcoholate of titanium in an alcohol solution, hydrolyzing the mixture with water, digesting the mixture at the boiling point, recovering the barium titanate hydrate from the said digestion by filtration, calcining the product at a temperature below 1600° F., grinding the calcine to a particle size smaller than 5 microns, mixing a readily dissipated binder with the finely ground barium titanate, forming the mixture into a coherent body and maintaining said body at a temperature between about 2400° F. and about 2600° F. for a time not exceeding 10 minutes, and rapidly cooling the fired body to obtain a finished article in which the particle size of the individual crystallites is between about 1 and 5 microns.

6. A method of preparing a pure barium titanate ferroelectric material in the form of particles substantially all of which are smaller than 5 microns in size which comprises: mixing an alcoholate of barium with an alcoholate of titanium in an alcohol solution, hydrolyzing the mixture with water, digesting the mixture at the boiling point, recovering the barium titanate hydrate from the said digestion by filtration, calcining the product at a temperature below 1600° F., grinding the calcine to a particle size smaller than 5 microns mixing a readily dissipated binder with the finely divided ferroelectric material, forming the mixture into a coherent body, heating the body to remove the binder completely, and then maintaining the body at a temperature of between about 2400° F. and 2600° F. for a time period not exceeding 10 minutes to obtain a finished article in which the individual crystallites are between about 1 and 5 microns.

References Cited in the file of this patent

UNITED STATES PATENTS

| | | |
|---|---|---|
| 2,166,221 | Patterson | June 29, 1937 |
| 2,434,079 | Nutting | Jan. 6, 1948 |
| 2,646,359 | Wainer | July 21, 1953 |
| 2,695,239 | Oshry | Nov. 23, 1954 |
| 2,695,240 | Oshry | Nov. 23, 1954 |
| 2,758,911 | Lynd et al. | Aug. 14, 1956 |
| 2,812,234 | Robinson | Nov. 5, 1957 |
| 2,827,360 | Blumenthal | Mar. 18, 1958 |

FOREIGN PATENTS

| | | |
|---|---|---|
| 691,257 | Great Britain | 1953 |
| 507,817 | Canada | 1954 |

OTHER REFERENCES

Anliker et al.: Helv. Phys. Acta, vol. 25 (pages 474–5) 1952, "Behavior of Very Small Ferroelectric Particles."